(12) United States Patent
Kalloo et al.

(10) Patent No.: US 6,948,302 B1
(45) Date of Patent: Sep. 27, 2005

(54) RAKE APPARATUS

(76) Inventors: Ishmael Kalloo, 7751 Indigo St., Miramar, FL (US) 33023; Jennifer Kalloo, 7751 Indigo St., Miramar, FL (US) 33023

( * ) Notice: Subject to any disclaimer, the term of this patent is extended or adjusted under 35 U.S.C. 154(b) by 0 days.

(21) Appl. No.: 10/971,863

(22) Filed: Oct. 25, 2004

(51) Int. Cl.[7] .................................................. A01D 7/00
(52) U.S. Cl. ................................. 56/400.19; 56/400.04
(58) Field of Search ........................ 56/400.19, 400.04, 56/400.12, 400.06, 400.1, 400.07, 400.16; 294/51, 50.6, 50.8, 50.9

(56) References Cited

U.S. PATENT DOCUMENTS

| | | | |
|---|---|---|---|
| 3,601,966 A | 8/1971 | Kerry | |
| 3,668,850 A * | 6/1972 | Horkey | ..................... 56/400.04 |
| 4,236,742 A * | 12/1980 | Florence | ..................... 294/24 |
| 4,378,671 A | 4/1983 | Gascon | |
| RE33,702 E * | 10/1991 | Allen | ..................... 56/400.12 |
| 6,101,799 A | 8/2000 | Darnell | |
| 6,272,827 B1 | 8/2001 | Hsu | |
| 6,336,314 B1 | 1/2002 | Crevier | |
| 6,367,236 B1 * | 4/2002 | Marcone | ..................... 56/400.12 |
| D474,948 S | 5/2003 | Crites | |
| 2002/0139101 A1 | 10/2002 | Crites | |

* cited by examiner

*Primary Examiner*—Árpád Fábián Kovács

(57) ABSTRACT

A rake apparatus includes an elongated handle with an upper wall, a peripheral wall, and an open bottom end. A head is attached to the bottom end and has a bottom surface having an opening therein. Each of a plurality of first teeth is attached to the head. An axle is mounted within the opening. A pawl is rotatably mounted on the axle. The pawl includes a first arm and a second arm orientated generally perpendicular to each other. The second arm extends downwardly through the opening. Each of a plurality of second teeth is attached to the second arm. An actuator is coupled to the first arm and is adapted for selectively urging the first arm upwardly. The actuator may be selectively actuated so that the second teeth are moved toward the first teeth.

7 Claims, 4 Drawing Sheets

RAKE APPARATUS

BACKGROUND OF THE INVENTION

1. Field of the Invention

The present invention relates to rake devices and more particularly pertains to a new rake device for raking leaves into a pile that may then be picked up using the device.

2. Description of the Prior Art

The use of rake devices is known in the prior art. U.S. Pat. No. 3,601,966 describes a device that includes a pair of sets of teeth that may be moved toward each other by moving an actuator up and down a handle of the device. Another type of rake device is U.S. Pat. No. 6,336,314 again includes an actuator that is slid upwardly or downwardly a handle to move sets of teeth away for toward each other.

While these devices fulfill their respective, particular objectives and requirements, the need remains for a device that includes an actuator that does not require the movement of an actuator upwardly and downwardly along a handle so that the device is simpler to use and requires less effort. This also allows a person to retain their lower hand at fixed position on the handle so that the use of the device for both raking leaves and for lifting leaves is more comfortable.

SUMMARY OF THE INVENTION

The present invention meets the needs presented above by generally comprising an elongated handle that includes an upper wall and a peripheral wall that is attached to and extends downwardly from the upper wall. The handle has an open bottom end. A head is attached to the bottom end. The head has a bottom surface which has an opening therein that extends into the bottom end. Each of a plurality of first teeth has a first end and a second end. The first ends of the first teeth are attached to the head and are generally aligned with respect to each other. An axle is mounted within the opening. A pawl is rotatably mounted on the axle. The pawl includes a first arm and a second arm orientated generally perpendicular to each other. The first arm is positioned within the opening and generally extends from the axle toward a front side of the head. The second arm extends downwardly through the opening. Each of a plurality of second teeth has a first end and a second end. The first ends of the second teeth are attached to the second arm. An actuator is coupled to the first arm and is adapted for selectively urging the first arm upwardly. The actuator may be selectively actuated so that the second teeth are moved toward the first teeth.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
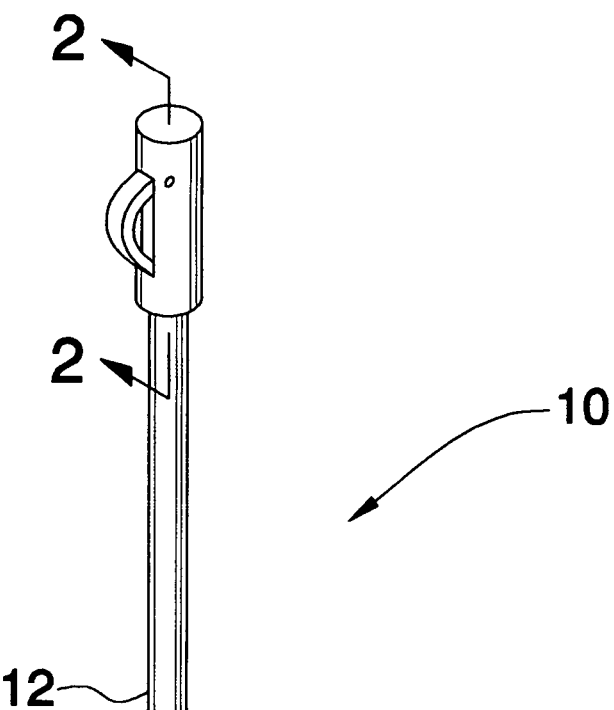
FIG. 1 is a perspective view of a rake apparatus according to the present invention.
Figure 1:
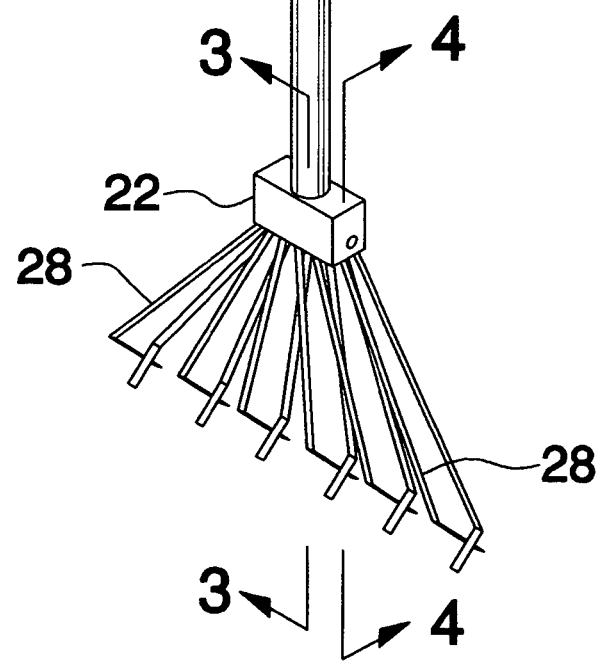
Figure 2:
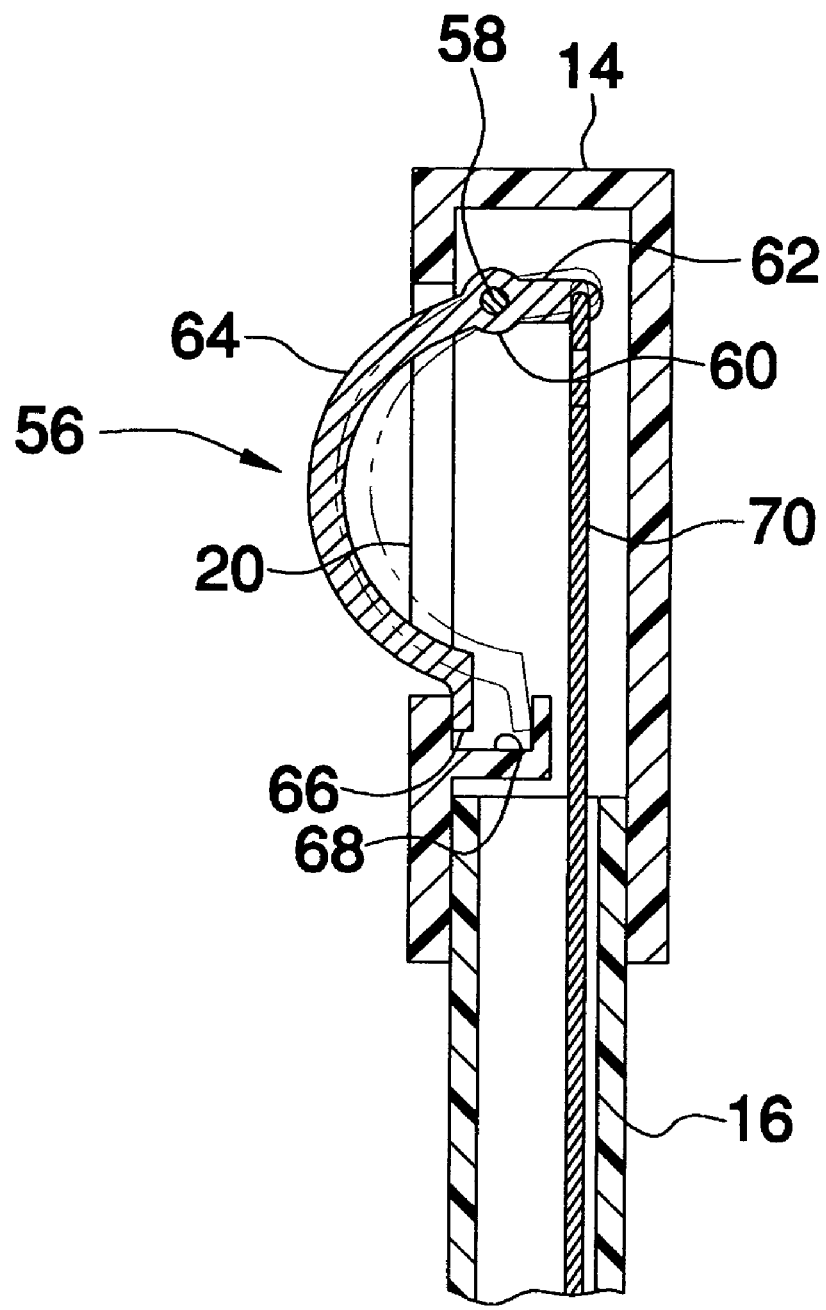
FIG. 2 is a cross-sectional view taken along line 2—2 of FIG. 1 of the present invention.
Figure 3:
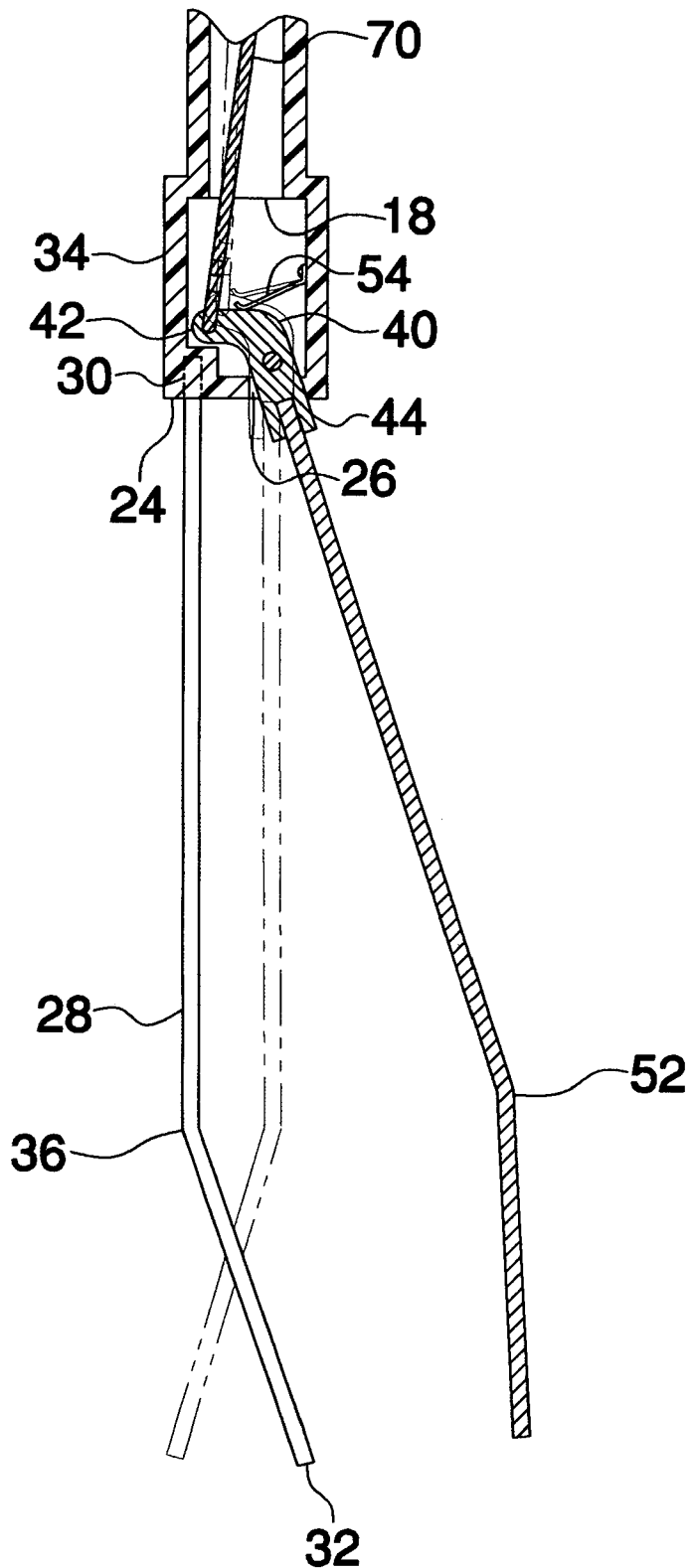
FIG. 3 is a cross-sectional view taken along line 3—3 of FIG. 1 of the present invention.
Figure 4:
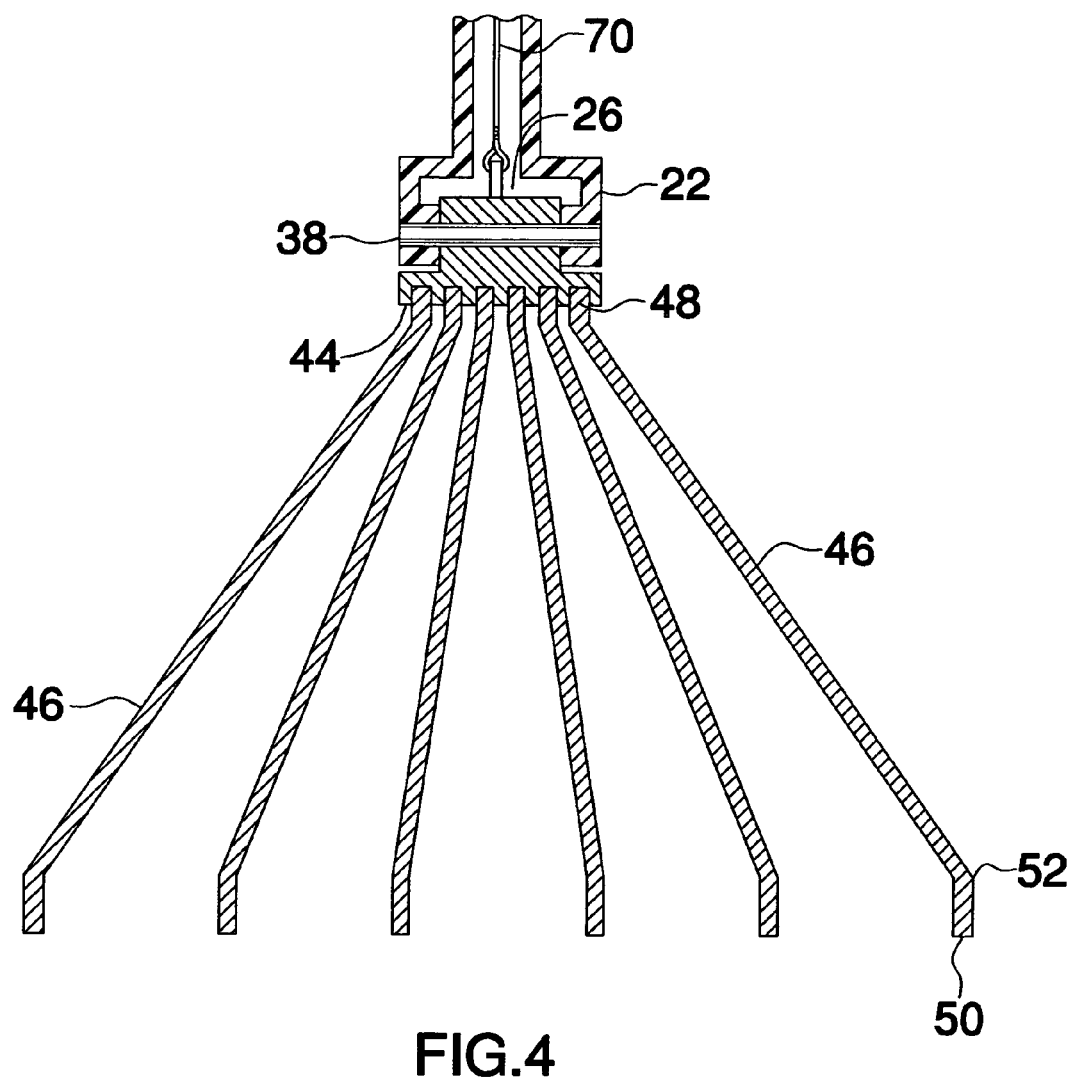
FIG. 4 is a cross-sectional view taken along line 4—4 of FIG. 1 of the present invention.

With reference now to the drawings, and in particular to FIGS. 1 through 4 thereof, a new rake device embodying the principles and concepts of the present invention and generally designated by the reference numeral 10 will be described.

As best illustrated in FIGS. 1 through 4, the rake apparatus 10 generally comprises an elongated handle 12 that includes an upper wall 14 and a peripheral wall 16, which is attached to and extends downwardly from the upper wall 14. The handle 12 has an open bottom end 18. An aperture 20 extends through the peripheral wall 16 and is positioned adjacent to the upper wall 14.

A head 22 is attached to the bottom end 18. The head 22 has a bottom surface 24. The bottom surface 24 has an opening 26 therein which extends into the bottom end 18 of the handle 12.

A plurality of first teeth 28 is provided. Each of the first teeth 28 has a first end 30 and a second end 32. The first ends 30 of each of the first teeth 28 are attached to the head 22 and are generally aligned with respect to each other. The first teeth 28 are positioned adjacent to a front side 34 of the head 22. Each of the first teeth 28 has a bend 36 therein positioned generally adjacent to the second ends 30 of the first teeth 28 so that the second ends 32 of the first teeth 28 are angled rearward with respect to the head 22.

An axle 38 is mounted within the opening 26. The axle 38 is aligned generally parallel with the front side 34 of the head 22. A pawl 40 is rotatably mounted on the axle 38. The pawl 40 includes a first arm 42 and a second arm 44 orientated generally perpendicular to each other. The first arm 42 is positioned within the opening 26 and extends generally from the axle 38 toward the front side 34 of the head 22. The second arm 44 extends downwardly through the opening 26.

A plurality of second teeth 46 is also provided. Each of the second teeth 46 has a first end 48 and a second end 50. The first ends 48 of the second teeth 46 are attached to the second arm 44. The first ends 48 of the second teeth 46 are generally aligned along a line orientated parallel to the axle 38. Each of the second teeth 46 has a bend 52 therein positioned generally adjacent to the second ends 50 of the second teeth 46 so that the second ends 50 of the second teeth 46 are angled forward with respect to the head.

A biasing member 54 is mounted in the head and is adapted for biasing the first arm 42 downward. The biasing member 54 may include a resiliently flexible element attached to an inner surface of the head 22 and abutted against the first arm 42.

An actuator 56 is coupled to the first arm 42 and is adapted for selectively urging the first arm 42 upwardly. The actuator 56 includes a spindle 58 that is mounted in the handle 12 and is positioned adjacent to the aperture 20. A rod 60 is pivotally coupled to the spindle 58. The rod 60 is divided by the spindle 58 into an inner portion 62 positioned within the handle 20 and an outer portion 64 extending outwardly of the aperture 20. A free end 66 of the outer portion 64 may be positioned within a catch 68 to control the movement of the rod 60. A tether 70 extends between and is attached to the inner portion 62 and the first arm 42. The actuator 56 may be selectively actuated so that the second teeth 46 are moved toward the first teeth 28.

In use, the rake apparatus 10 is generally used as a conventional rake wherein the first teeth 28 are used to rake up leaves. When a pile is formed. The actuator 56 is used to hold the leaves between the first 28 and second 46 teeth so that they may be picked up and discarded.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A rake assembly comprising:
   an elongated handle including an upper wall and a peripheral wall being attached to and extending downwardly from said upper wall, said handle having an open bottom end;
   a head being attached to said bottom end, said head having a bottom surface, said bottom surface having an opening therein extending into said bottom end;
   a plurality of first teeth, each of said first teeth having a first end and a second end, each of said first ends of said first teeth being attached to said head and being generally aligned with respect to each other;
   an axle being mounted within said opening;
   a pawl being rotatably mounted on said axle, said pawl including a first arm and a second arm orientated generally perpendicular to each other, said first arm being positioned within said opening and generally extending from said axle toward a front side of said head, said second arm extending downwardly through said opening;
   a plurality of second teeth, each of said second teeth having a first end and a second end, each of said first ends of said second teeth being attached to said second arm;
   an actuator being coupled to said first arm and being adapted for selectively urging said first arm upwardly; and
   wherein said actuator may be selectively actuated such that said second teeth are moved toward said first teeth.

2. The assembly according to claim 1, wherein each of said first teeth is positioned adjacent to said front side of said head, each of said first teeth having a bend therein positioned generally adjacent to said second ends of said first teeth such that said second ends of said first teeth are angled rearward with respect to said head, said axle being aligned generally parallel with said front side of said head, said first ends of said second teeth being generally aligned along a line orientated parallel to said axle, each of said second teeth having a bend therein positioned generally adjacent to said second ends of said second teeth such that said second ends of said second teeth are angled forward with respect to said head.

3. The assembly according to claim 2, further including a biasing member being mounted in said head and being adapted for biasing said first arm downward.

4. The assembly according to claim 1, further including a biasing member being mounted in said head and being adapted for biasing said first arm downward.

5. The assembly according to claim 1, wherein said actuator includes;
   a spindle mounted in said handle and being positioned adjacent to an aperture positioned adjacent to said upper wall;
   a rod being pivotally coupled to said spindle, said rod being divided by said spindle into an inner portion positioned within said handle and an outer portion extending outwardly of said aperture; and
   a tether extending between and being attached to said inner portion and said first arm.

6. The assembly according to claim 3, wherein said actuator includes;
   a spindle mounted in said handle and being positioned adjacent to an aperture positioned adjacent to said upper wall;
   a rod being pivotally coupled to said spindle, said rod being divided by said spindle into an inner portion positioned within said handle and an outer portion extending outwardly of said aperture; and
   a tether extending between and being attached to said inner portion and said first arm.

7. A rake assembly comprising:
   an elongated handle including an upper wall and a peripheral wall being attached to and extending downwardly from said upper wall, said handle having an open bottom end, an aperture extending through said peripheral, said aperture being positioned adjacent to said upper wall;
   a head being attached to said bottom end, said head having a bottom surface, said bottom surface having an opening extending therein and upwardly into said bottom end;
   a plurality of first teeth, each of said first teeth having a first end and a second end, each of said first ends of said first teeth being attached to said head and being generally aligned with respect to each other, said first teeth being positioned adjacent to a front side of said head, each of said first teeth having a bend therein positioned generally adjacent to said second ends of said first teeth such that said second ends of said first teeth are angled rearward with respect to said head;
   an axle being mounted within said opening, said axle being aligned generally parallel with said front side of said head;
   a pawl being rotatably mounted on said axle, said pawl including a first arm and a second arm orientated generally perpendicular to each other, said first arm being positioned within said opening and generally extending from said axle toward said front side of said head, said second arm extending downwardly through said opening;
   a plurality of second teeth, each of said second teeth having a first end and a second end, each of said first ends of said second teeth being attached to said second arm, said first ends of said second teeth being generally aligned along a line orientated parallel to said axle, each of said second teeth having a bend therein positioned generally adjacent to said second ends of said second teeth such that said second ends of said second teeth are angled forward with respect to said head;

a biasing member being mounted in said head and being adapted for biasing said first arm downward;

an actuator being coupled to said first arm and being adapted for selectively urging said first arm upwardly, said actuator including;

a spindle mounted in said handle and being positioned adjacent to said aperture;

a rod being pivotally coupled to said spindle, said rod being divided by said spindle into an inner portion positioned within said handle and an outer portion extending outwardly of said aperture;

a tether extending between and being attached to said inner portion and said first arm; and wherein said actuator may be selectively actuated such that said second teeth are moved toward said first teeth.

* * * * *